F. C. SPENCER.
DRILL PRESS.
APPLICATION FILED FEB. 7, 1919.
1,403,985.
Patented Jan. 17, 1922.
4 SHEETS—SHEET 1.
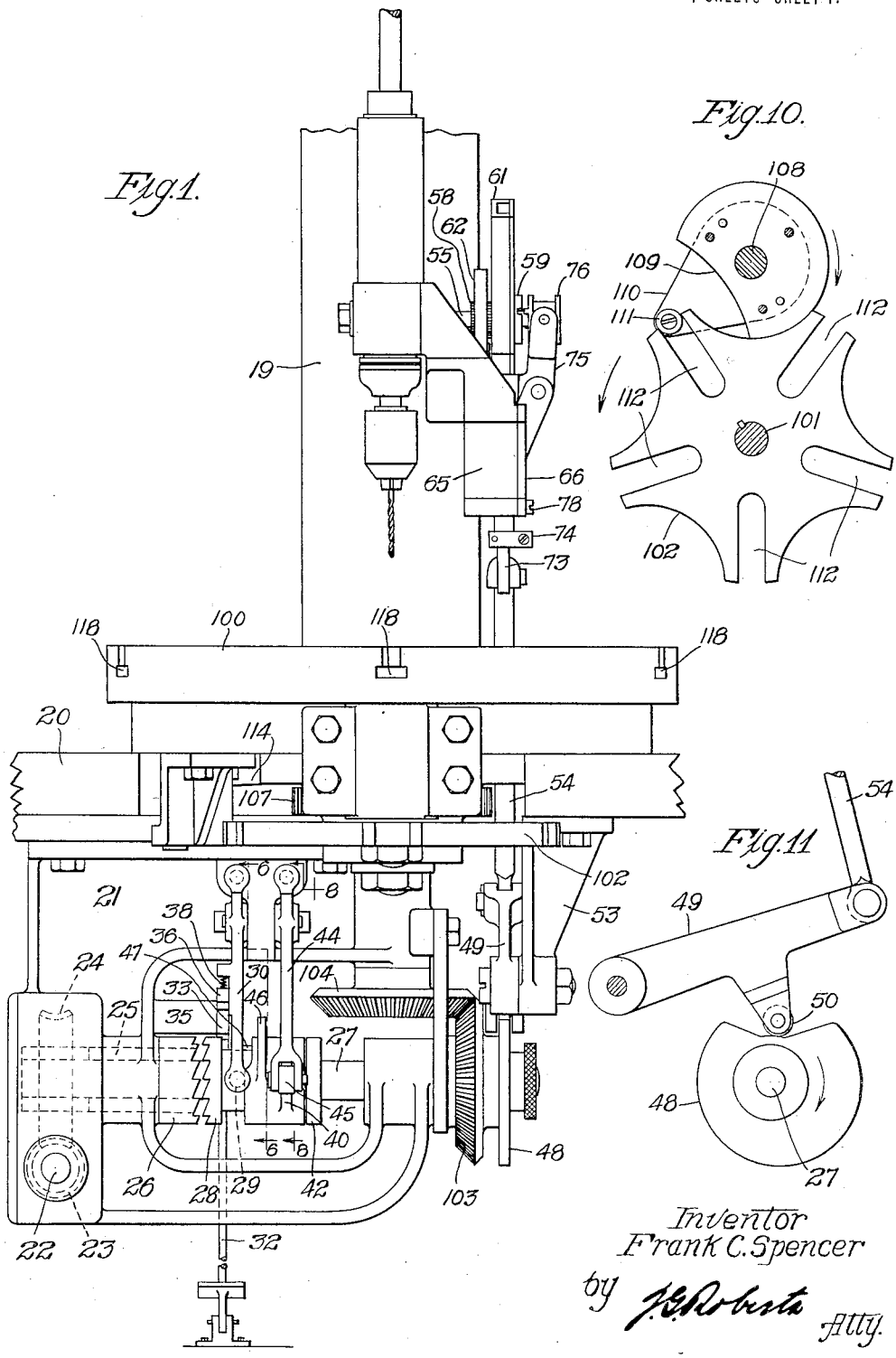
Inventor
Frank C. Spencer
by J. G. Roberts Atty.

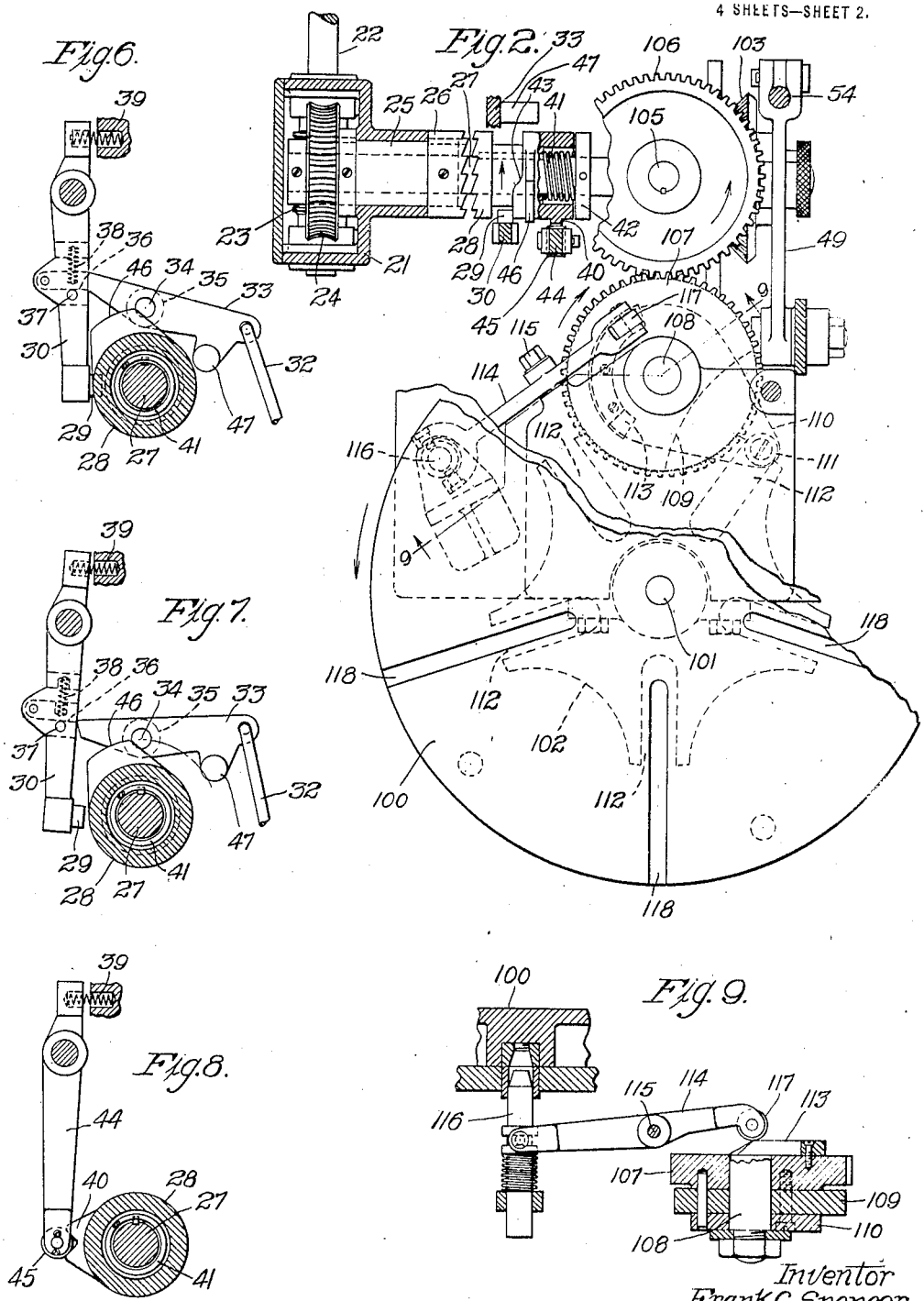

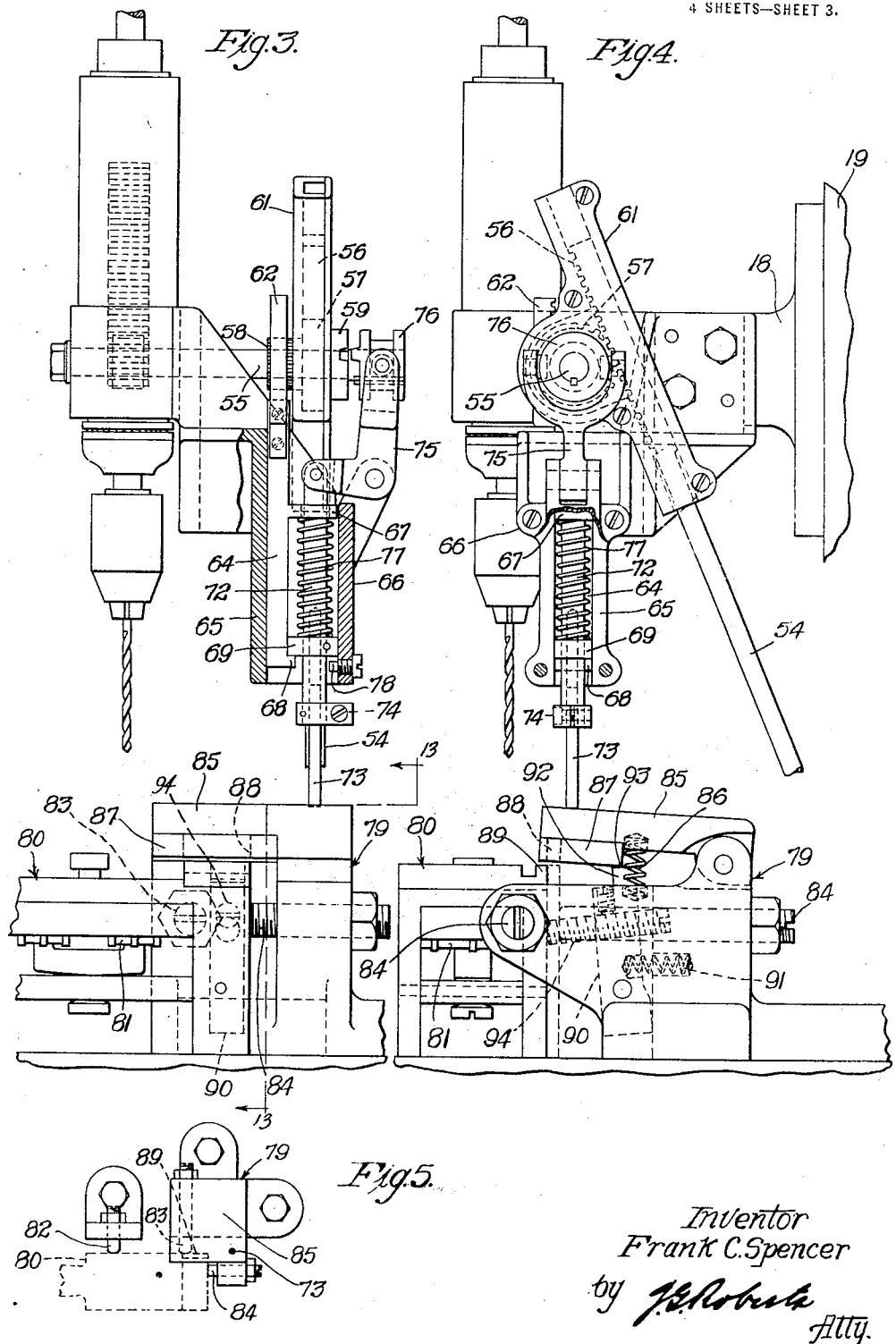

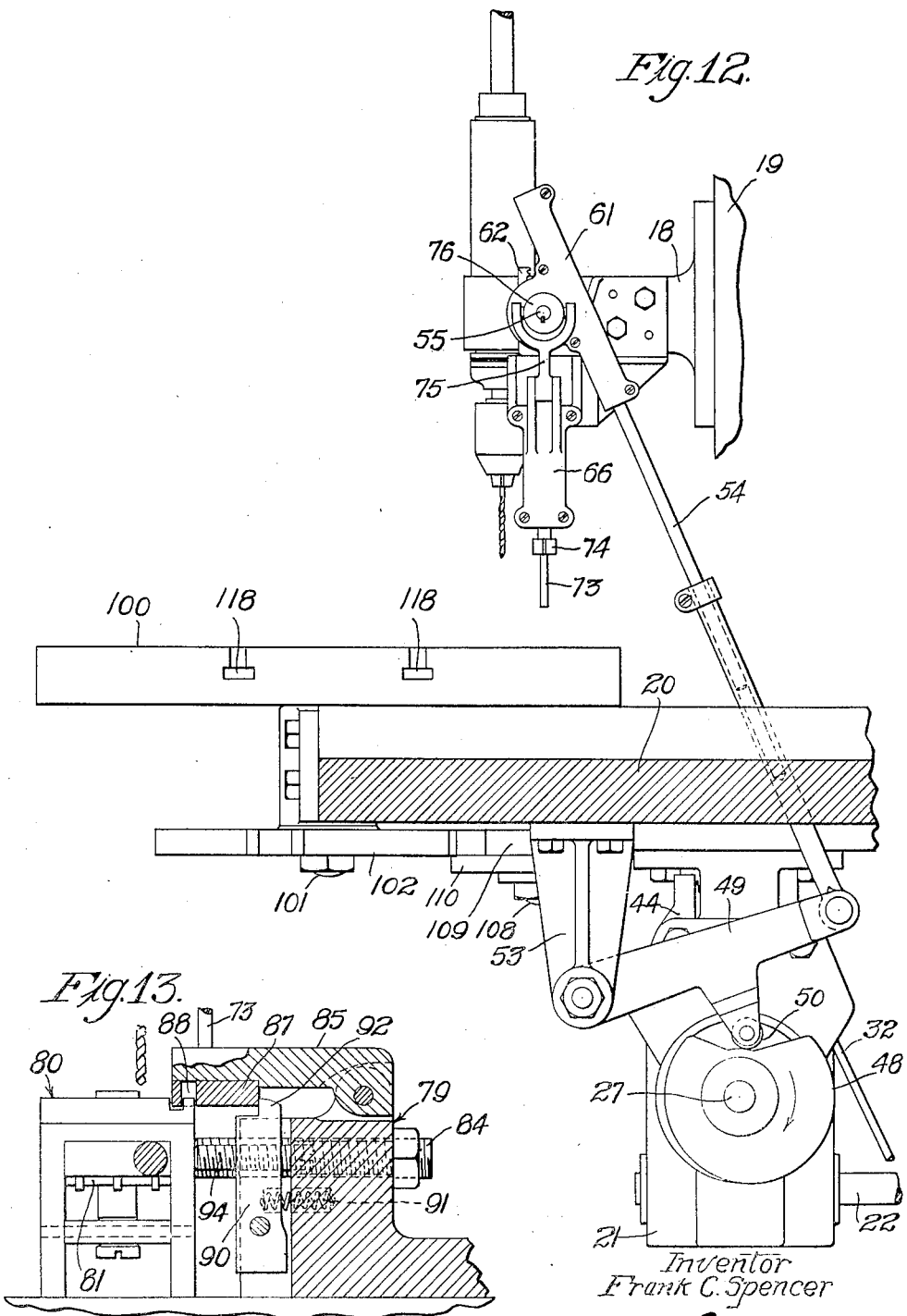

UNITED STATES PATENT OFFICE.

FRANK C. SPENCER, OF HARTFORD, CONNECTICUT, ASSIGNOR TO WESTERN ELECTRIC COMPANY, INCORPORATED, OF NEW YORK, N. Y., A CORPORATION OF NEW YORK.

DRILL PRESS.

1,403,985.  Specification of Letters Patent.  Patented Jan. 17, 1922.

Application filed February 7, 1919. Serial No. 275,507.

*To all whom it may concern:*

Be it known that I, FRANK C. SPENCER, a citizen of the United States, residing at Hartford, in the county of Hartford and State of Connecticut, have invented certain new and useful Improvements in Drill Presses, of which the following is a full, clear, concise, and exact description.

This invention relates to drill presses, and more particularly to drill presses of the type in which the drill carrying sleeve is fed automatically toward and away from the work to be operated upon.

The object of this invention in general is to improve the operation of such machines in such a manner that injury to drills and jigs, due to improper feeding, will be avoided and the work in general will be performed accurately and rapidly.

In accordance with one of the features of this invention, means are provided for preventing the feeding of the sleeve except when the work holder is accurately positioned upon the table of the drill press. In accordance with this feature of the invention there is provided a normally disengaged clutch member through which the sleeve is driven, and the operation of this clutch member to apply the driving power to the sleeve for feeding it is controlled through the work holding jig. In the device illustrated this is accomplished by means of a vertically movable member which controls the lever for engaging and disengaging the clutch members and which is controlled in its operative movement by means of a hinged stop member cooperating with the work holding jig and with which a plunger cooperates when the work is properly positioned.

In accordance with another feature of this invention a plurality of jigs are provided and provision is made for rotating the work holding table intermittently to present a work holding jig under the drill for each downward movement of the sleeve. Means are also provided for locking and unlocking the turntable before and after each complete operation of the drill, so that it will be impossible under any circumstances to operate the drill or table prematurely.

Another feature of this invention relates to the clutch controlling mechanism for driving the feeding mechanism whereby a repeat operation of the clutch mechanism controlling the sleeve feed is impossible unless the foot treadle is allowed to return to its normal position and again depressed downward. In accordance with this feature of the invention the operation of the clutch insures a positive operation of the foot treadle into a fully operative position, and a pivotal pawl cooperating with a latch member controlled by the foot treadle renders the latch member inoperative until the foot treadle has been fully returned to an inoperative position.

In the drawings—

Fig. 1 is a view in front elevation of a drill press embodying the invention;

Fig. 2 is a partial plan view thereof, parts being shown in section;

Fig. 3 is a view in front elevation of the drill spindle and the automatic feeding mechanism, parts being shown in section, and an automatic stop used therewith;

Fig. 4 is a side elevation thereof, parts being broken away;

Fig. 5 is a plan view of the automatic stop shown in Figs. 3 and 4 on a reduced scale with a jig shown in place in dotted outline;

Fig. 6 is a vertical section on the line 6—6 of Fig. 1, showing the mechanism which controls the main driving clutch member in a position in which the clutch members are disengaged;

Fig. 7 is the same as Fig. 6 except that the mechanism is in a position which allows the clutch members to be engaged;

Fig. 8 is a section on the line 8—8 of Fig. 1, showing the mechanism for stopping the sliding clutch member in the same position after each revolution;

Fig. 9 is a vertical section on the line 9—9 of Fig. 2, showing the mechanism for locking and unlocking the turntable;

Fig. 10 is a plan view of a Geneva stop motion mechanism used to revolve the turntable one-fifth of a revolution for each revolution of the clutch shaft and shows the position of the roller arm and the disk at the completion of a movement;

Fig. 11 is a side view of a cam used to operate the feeding mechanism;

Fig. 12 is a side elevation looking from the right of Fig. 1, and

Fig. 13 is a vertical section on the line 13—13 of Fig. 3 with the plunger 73 in its lower position.

As shown in the drawings, the drill press is of the well-known type in which the drill spindle is moved down to the work through a sleeve and a rack and pinion, the pinion being secured to a horizontal shaft. The drill spindle can be driven in any well-known manner, but is preferably belt-driven. The complete drill is carried from an arm 18 fastened to a standard 19 which rests on top of a bench 20 with the driving mechanism for feeding the sleeve and for operating a turntable carried underneath by a bracket 21.

At one end of the bracket 21 is mounted a main driving shaft 22 which may be driven from any suitable source of power. The shaft 22 is suitably journaled in the bracket 21 and has affixed to its end a worm gear 23 which meshes with a worm wheel 24 affixed to one end of a sleeve 25. The other end of the sleeve 25 carries a driving clutch member 26. The sleeve 25 is loosely mounted on a shaft 27 which is located above the shaft 22 and at right angles thereto and has splined thereon a second clutch member 28 which normally is held out of engagement with the driving clutch member 26 by a stud 29 on the lower end of a lever 30. In order to release the clutch member 28 to bring it into engagement with the driving clutch member 26 it is necessary to operate a foot treadle shown in Fig. 1 which will cause a rod 32 to move upward. (See Figs. 1, 6, and 7). The upper end of the rod 32 is attached to a latch 33 pivoted at 34 to a boss 35 on the bracket 21. In contact with the front end of the latch 33 is a pawl 36 mounted on the side of the lever 30. The lower side of the pawl 36 rests on a pin 37 in the lever 30 and is held normally in this position by a spring 38 in contact with its upper side. Any movement of the rod 32 upward will cause the front end of the latch 33 to move downward, thereby causing the pawl 36 to move back, which movement causes the lever 30 carrying the stud 29 to move outward at the bottom, thus disengaging the stud from the clutch member 28. The lever 30 is suitably pivoted on the bracket 21 and a spring 39 is in contact with its upper end which tends to keep the lower end carrying the stud 29 in its normal position. When the stud 29 is moved out of contact with the clutch member 28 it is moved into contact with the driving clutch member 26 by a spring 41 mounted on the shaft 27 and normally held under compression between a collar 42 on the shaft 27 and the clutch member 28. The engagement of the clutch member 28 with the driving clutch member 26 causes it to make one complete revolution, but before the revolution is completed the stud 29 enters a cam groove 43 in the clutch member 28 and, due to a slight cam action in this groove, disengages the clutch just before the revolution has been completed. In order to stop the clutch member 28 in exactly the same position after each revolution, the clutch member 28 is equipped with a notched projection 40 and adjacent the lever 30 is a second lever 44 pivoted and equipped with spring means, similar to the lever 30, and carrying at its lower end a roller 45 which engages the notch in the projection 40 on the clutch member 28 to stop it in the same position after each revolution. (See Figs. 1 and 8).

It is necessary that the clutch members make only one revolution for each operation of the treadle and that the treadle be allowed to return to its normal position before the next revolution of the clutch members. This is accomplished in the following manner:

The clutch member 28 is provided with a cam face 46 which when the clutch member 28 moves, comes into contact with a stud 47 on the latch 33 which causes the front end of the latch 33 to be moved downward below the pawl 36, thereby allowing the stud 29 to enter the cam groove 43 to disengage the clutch members.

On the right hand end of the shaft 27 is mounted a cam 48. Each time the treadle is operated the cam 48 makes one complete revolution. Directly above and in line with the cam 48 is a lever 49 equipped with a cam roller 50 which rides on the face of the cam 48. The lever 49 is pivoted at one end to a bracket 53 and is connected at its other end to an adjustable connecting rod 54 which passes upward through suitable openings in the bench 20 and the base of the drill press which is mounted on top of the bench 20 to operate the sleeve operating spindle 55. The cam 48 is so designed that a quick advance of the drill to the work is provided, then a slow feed suitable for the work to be drilled, and quick return. The upper end of the connecting rod 54 has a rack 56 cut on its side which meshes with a pinion 57 loosely mounted together with a second pinion 58 and a driving clutch member 59 on the spindle 55. The pinions 57, 58 and the clutch member 59 may be of one piece which is loosely mounted on the spindle 55. A housing 61 encloses the upper end of the connecting rod 54 and also the pinion 57. The housing 61 is loosely mounted on the pinions 57, 58 and the clutch member 59 and acts as a guide for the rack 56 in its movements up and down. Meshing with the pinion 58 is a rack 62 which is secured to the top of a clutch operating member 64 which rides in a housing 65. Any upward movement of the connecting rod 54 caused by the cam 48 will cause a downward movement of the rack 62 and the clutch operating member 64, and a downward movement of the rod 54 will cause an upward movement of the member 64.

A cover 66 holds the member 64 in place. Projecting from the member 64 in line with the top of the cover 66 is an arm 67 and projecting from the bottom of the member 64 is a lip 68 on which rests a square collar 69 pinned to a rod 72. Tapped into the bottom end of the rod 72 is an adjustable plunger 73 which can be clamped in any desired position by the split collar 74, the rod 72 being split at the bottom to permit this. The purpose of the plunger 73 will be explained later.

Passing loosely through the arm 67 the upper end of the rod 72 is secured to the lower arm of a bell crank 75 which is pivoted on arms extending upwardly from the cover 66. The upper arm of the bell crank 75 straddles a clutch member 76 which is slidable on the spindle 55, but revolves therewith. Between the arm 67 and the square collar 69 and encircling the rod 72 is a compression spring 77. A short distance below the square collar 69 and screwed into the cover 66 is a stop screw 78 which limits the downward movement of the square collar 69. In the downward movement of the member 64 caused by the upward movement of the rod 54 the square collar 69 and the rod 72 on which it is pinned will move downward until the collar 69 engages the stop screw 78. This downward movement of the rod 72 is caused by the arm 67 bearing on the spring 77 which encircles the rod 72 between the upper surface of the collar 69 which is pinned onto the rod 72 and the lower surface of the arm 67.

The rod 72 in its downward movement will swing the upper arm of the bell crank 75 which in its movement will carry the slidable clutch member 76 into engagement with the driving clutch member 59 thereby rotating the sleeve operating spindle 55.

Used in connection with the mechanism just described is an automatic stop 79. (See Figs. 3, 4, and 5.) A jig 80 carrying a part 81 to be drilled is located against several adjustable stop screws 82, 83, and 84 which are so located as to contact with two sides of the jig 80 when the jig is properly placed in position. The automatic stop 79 is provided with a hinged lid 85 normally held up by a spring 86 and is located directly under the plunger 73. Secured underneath the front end of the lid 85 is a hardened tool steel plate 87 provided with a slot 88 which slot will register with a tongue 89 on the top of the jig 80 when the jig is properly placed in position. Suitably pivoted from the walls of the automatic stop 79 is a latch 90 directly under the lid 85 and held in an inclined position by a spring 91. Its movement outward is limited by its lower end coming into contact with a wall of the automatic stop 79. In the normal position of latch 90 a shoulder 92 on its upper part fits under a corner 93 of the plate 87. An adjustable pin 94 carried by the latch 90 moves it back far enough to allow the shoulder 92 to pass back of the corner 93 on the plate 87 when the jig 80 is placed in correct position against the stops 82, 83, and 84. At the same time the tongue 89 on the jig 80 will register with the slot 88 in the plate 87.

If the jig 80 is squarely in place against the stops 82, 83, and 84 the plunger 73 will move downwardly unobstructed when the treadle is operated, thereby causing the bell crank 75 to slide the clutch member 76 into engagement with the driving clutch member 59 and thereby operating the sleeve of the drill press through the sleeve operating spindle 55 in the well known manner. In case the jig is not up against the stops or not squarely up against all the stops the plunger 73 cannot be moved downward to cause the clutch to be engaged, but the pinions 57 and 58 will revolve under the action of the rack 56 and the sleeve of the press will not be lowered. The clutch, composed of members 59 and 76, is of the one-jaw type, the jaw being located slightly off center so that it will be impossible for the clutch to engage at any other than the correct time.

A turntable 100 is provided by which an operator can load and unload jigs affixed to the top of same, while the work in the jig which is at that time located under the drill spindle will be drilled. (See Figs. 1, 2, 9, and 10). The turntable 100 is mounted on a shaft 101 suitably supported from the base of the drill press. On the lower end of the shaft 101 is secured a Geneva stop motion disk 102, which is driven in the following manner: A mitre gear 103 is affixed to the shaft 27 directly in back of the cam 48. The mitre gear 103 meshes with a mitre gear 104 mounted on the lower end of a vertical shaft 105 which carries on its upper end a spur gear 106, which gear meshes with a spur gear 107 mounted on a shaft 108 located directly in front of the shaft 105. (See Fig. 2). Secured to the under side of the gear 107 is a locking disk 109 and a roller arm 110 which carries at its end a roller 111 which engages the slots 112—112 in the Geneva stop motion disk 102 when rotated. For each revolution of the shaft 27 the turntable will register one-fifth of a revolution or other fractional part of a revolution as desired.

It is desirable that the turntable 100 should be positively locked in position after each registration of the jig under the drill and while the work is being drilled. At the completion of the drilling the turntable is automatically unlocked and then revolved for the next registration and locked again. To accomplish this locking and unlocking of the turntable there is mounted on the upper side of the gear 107 a cam 113 which operates a cam lever 114 suitably pivoted at 115 and forked at one end to straddle a pin 116. The lever 114 carries at its other end a roller 117 which rides on the cam 113. Just before the roller arm 110 carrying the roller 111 engages one of the slots 112—112 in the disk 102, the roller 117 will ride up on the cam 113, thereby operating the lever 114 to draw the pin 116 from one of the five openings in the turntable 100, thereby releasing same to be revolved one-fifth of a revolution and at the end of its registration the roller 117 will ride down from the cam 113 causing the pin 116 to register in the next opening in the turntable. The automatic stop 79 can be mounted on the turntable for properly locating the jig, or the jig can be held and located by suitable T slots 118 in the top of the turntable, the jig in that case being provided with a suitable hole which would allow the plunger 73 to enter when it is properly located.

The operation of this automatic mechanism for operating the sleeve of a drill press to feed the drill to and from the work, including the safety device which allows the sleeve to descend to the work only when the jig carrying the work is properly located, along with the turntable with suitable mechanism for causing it to register one-fifth of a revolution just before or after the operation of the drill feeding mechanism, and the operation of the automatic corner stop is as follows:

The driving clutch member 26 is constantly rotating loosely on the shaft 27 with the sliding clutch member 28 held out of engagement with same by the stud 29 on the lever 30. The operator places and locates the jig 80 on the dial table 100 against the stops 82, 83, and 84 which are used along with the automatic stop 79. In locating the jig squarely against the stops 82, 83, and 84 the latch 90 on the automatic stop will be moved back, thereby moving the shoulder 92 of the latch from under the corner 93 of the plate 87 and registering the tongue 89 on the jig directly under the slot 88 in the plate 87. The hinged lid can now move down when the plunger 73 is operated which allows the clutch members 59 and 76 to be engaged and which will cause the sleeve of the drill press to move down.

After placing the jig the operator operates the treadle, which forces the rod 32 to move upward, thereby causing the stud 29 to be moved out of engagement with the sliding clutch member 28 through the action of the latch 33 and the pawl 36. The clutch member 28 will now move into engagement with the driving clutch member 26 through the action of the spring 41 and rotate the shaft 27 one revolution.

To make it absolutely impossible for the shaft 27 to make more than one revolution unless the treadle is allowed to return to its normal position and again be operated by the operator, the cam 46 will force the latch 33 down, thereby allowing the stud 29 to move into the cam groove 43 to disengage the clutch. The sliding clutch member is stopped in the same position after each revolution by the roller 45 on the lever 44 engaging the notch in the projection 40 on the clutch member 28. The cam 48 will consequently revolve one revolution, it being secured to the shaft 27, and it will cause the rack 56 to move up and back through the lever 49 and the connecting rod 54. In its movement up and down, the rack 56 forces the rack 62 down and up again through the pinions 57 and 58. In moving down, the rack 62 carries the clutch operating member 64, which through the spring 77, the square collar 69, the rod 72, and the bell crank 75, moves the sliding clutch member 76 into engagement with the driving clutch member 59 which is rotated through the action of the rack 56 engaging the pinion 57 which is integral with the clutch member 56. The sleeve of the drill press will now move down to the work through the revolving of the sleeve operating spindle 55 in the well known manner.

What is claimed is:

1. In a drill press, a sleeve, power operated feed mechanism for said sleeve, normally disengaged clutch members for connecting said feed mechanism to said sleeve, normally disengaged clutch members for controlling said first clutch members, a manually operated actuator for causing said second clutch members to become engaged, a work holding jig, and means operated by the correct position of said jig therewith and subsequently without any attention to said jig for causing the engagement of said second clutch members upon a subsequent operation of said actuator.

2. In a drill press, a sleeve, power operated feed mechanism for said sleeve, normally disengaged clutch mechanism for connecting said feed mechanism with said sleeve, a power operated member for controlling the engagement of said clutch mechanism, a manually operated actuator for causing said power operated member to operate to cause the engagement of said clutch mechanism, a work holding jig, and means operated by the correct position of said jig therewith and subsequently without any attention to said jig for causing the operation of said power operated member upon a subsequent operation of said actuator.

3. In a drill press, a sleeve, power operated feed mechanism for said sleeve, normally disengaged clutch mechanism for connecting said feed mechanism with said sleeve, a power operated plunger member for controlling the engagement of said clutch members, a pivotal stop member for said plunger, and a work holder cooperating with said pivotal plate to permit a clutch engaging movement of said plunger.

4. In a drill press, a sleeve, power operated feed mechanism for said sleeve, normally disengaged clutch mechanism for connecting said feed mechanism with said sleeve, a yieldingly mounted power driven plunger for controlling the engagement of said clutch members, a work holding jig, a pivotal stop plate for normally holding said plunger in position to disengage the clutch mechanism said jig and said stop plate having registering surfaces brought into engagement by the proper positioning of the jig to permit a clutch engaging movement of said plunger, a bed, and adjustable stop members carried by said bed for locking said jig with the depression therein in position to be engaged by said plunger.

5. In a drill press, a sleeve, power operated feed mechanism for said sleeve, normally disengaged clutch mechanism for connecting said feed mechanism with said sleeve, a power driven plunger for controlling the engagement of said clutch members, a pivotal stop plate for normally holding said plunger in position to disengage said clutch members, means for locking said pivotal plate in such position, a work holding jig, and means controlled by the positioning of said work holding jig to unlock said stop plate to permit the clutch engaging movement of said plunger.

6. In a drill press, a sleeve, power operated feed mechanism for said sleeve, normally disengaged clutch mechanism for connecting said feed mechanism with said sleeve, a yieldingly mounted power driven plunger for controlling the engagement of said clutch members, a pivotal stop plate for normally holding said plunger in position to disengage the clutch mechanism, a pivotal lever for locking said pivotal plate in such position, a work holding jig, and means controlled by the positioning of said work holding jig to move said pivotal lever from locking engagement with said stop member to permit a clutch engaging movement of said plunger, said pivotal stop member and said jig having registering surfaces for permitting a complete movement of said stop member when said jig is properly positioned and said lever is released.

In witness whereof, I hereunto subscribe my name this 10th day of January, A. D., 1919.

FRANK C. SPENCER.